(12) United States Patent
Rawat et al.

(10) Patent No.: US 9,906,332 B2
(45) Date of Patent: Feb. 27, 2018

(54) RADIO LINK CONTROL RECOVERY BASED ON MEDIUM ACCESS FEEDBACK

(71) Applicant: Apple Inc., Cupertino, CA (US)

(72) Inventors: Naveen Rawat, San Jose, CA (US); Giri Prassad Deivasigamani, Cupertino, CA (US); Sachin Sane, San Jose, CA (US); Sai Sravan Bharadwaj Karri, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 3 days.

(21) Appl. No.: 14/725,416

(22) Filed: May 29, 2015

(65) Prior Publication Data

US 2016/0352467 A1    Dec. 1, 2016

(51) Int. Cl.
*H04L 1/18* (2006.01)

(52) U.S. Cl.
CPC .......... *H04L 1/1848* (2013.01); *H04L 1/1812* (2013.01)

(58) Field of Classification Search
CPC ....... H04L 1/08; H04L 1/1607; H04L 1/1812; H04L 1/1858; H04L 1/188; H04L 1/1841; H04L 29/06; H04L 1/1809; H04L 69/32; H04L 1/1854; H04L 72/01; H04W 76/02; H04W 36/02; H04W 36/0055; H04W 36/24; H04W 28/065; H04W 72/046
See application file for complete search history.

(56) References Cited

U.S. PATENT DOCUMENTS

| | | | |
|---|---|---|---|
| 8,588,175 B2 * | 11/2013 | Kim ...................... | H04L 1/1841 370/328 |
| 2002/0191544 A1 * | 12/2002 | Cheng .................... | H04L 29/06 370/236 |
| 2008/0301516 A1 * | 12/2008 | Han ....................... | H04L 1/1812 714/748 |
| 2011/0188464 A1 * | 8/2011 | Shinohara ........... | H04W 28/065 370/329 |
| 2016/0219458 A1 * | 7/2016 | Kubota ................. | H04W 28/06 |

* cited by examiner

*Primary Examiner* — Guerrier Merant
(74) *Attorney, Agent, or Firm* — Meyertons, Hood, Kivlin, Kowert & Goetzel, P.C.

(57) ABSTRACT

A wireless communication system and method are presented for reducing retransmission delays between a UE and an eNB. The UE is configured to establish a communication link to the eNB according to an interface protocol comprising at least a MAC layer and a RLC layer. The RLC layer is notified with at least a PDU data based on input from the MAC layer if no HARQ ACK is received when a maximum retransmission number is reached. A sequence number (SN) of the PDU may then be retransmitted from the RLC layer to the eNB.

14 Claims, 7 Drawing Sheets

RADIO LINK CONTROL RECOVERY BASED ON MEDIUM ACCESS FEEDBACK

BACKGROUND

Field

This disclosure is directed to wireless communications and, more particularly, to radio link recovery in wireless communications.

Description of the Related Art

Wireless communication systems are widely deployed to provide various communication services, such as: voice, video, packet data, circuit-switched info, broadcast, messaging services, and so on. A typical wireless communication system, or network, can provide multiple users access to one or more shared resources (e.g., bandwidth, transmit power, etc.). These systems can be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems and Orthogonal Frequency Division Multiple Access (OFDMA) systems.

Generally, a wireless multiple-access communication system can simultaneously support communication for multiple wireless devices or terminals. In such a system, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out (SISO), single-in-multiple-out (SIMO), multiple-in-signal-out (MISO), or a multiple-in-multiple-out (MIMO) system.

For instance, a MIMO system can employ multiple transmit antennas ($N_T$) and multiple receive antennas ($N_R$) for data transmission. A MIMO channel formed by the $N_T$ transmit and $N_R$ receive antennas can be decomposed into $N_S$ independent channels, which are also referred to as spatial channels, where $N_S \leq \min\{N_T, N_R\}$. Each of the $N_S$ independent channels can correspond to a dimension. The MIMO system can provide improved performance (e.g., higher throughput and/or greater reliability) if the additional dimensionalities created by the multiple transmit and receive antennas are utilized.

A MIMO system can support a time division duplex (TDD) and frequency division duplex (FDD) systems. In an FDD system, the transmitting and receiving channels are separated with a guard band (some amount of spectrum that acts as a buffer or insulator), which allows two-way data transmission by, in effect, opening two distinct radio links. In a TDD system, only one channel is used for transmitting and receiving, separating them by different time slots. No guard band is used. This can increase spectral efficiency by eliminating the buffer band and can also increase flexibility in asynchronous applications. For example, if less traffic travels in the uplink, the time slice for that direction can be reduced, and reallocated to downlink traffic.

SUMMARY OF THE INVENTION

In one set of embodiments, a method is presented to reduce transmission delays of a transmitter. The method may comprise configuring a maximum retransmission number. If no acknowledgment (ACK) is received by the transmitter when the maximum retransmission number is reached, the method may further comprise notifying an upper protocol layer of the transmitter of at least a relevant automatic retransmission request (ARQ) entity based on input from a lower protocol layer of the transmitter. The method may further comprise retransmitting a corresponding data from the upper protocol layer of the transmitter.

According to another set of embodiments, the transmitter may be selected from one of a user equipment (UE) and an evolved Node B (eNB). Further, the maximum retransmission number may be configured to 4, 6, or 8. The lower protocol layer of the transmitter may be a media access control (MAC) layer and the upper protocol layer of the transmitter may be a radio link control (RLC) layer. The upper protocol layer of the transmitter may retransmit the corresponding data without waiting for receiving a non-acknowledgement (NACK). The relevant ARQ entity may be a protocol data unit (PDU) corresponding to a hold in a PDU sequence on a wireless receiver. The corresponding data may be a sequence number (SN) of the PDU. The corresponding data may be re-transmitted when a t_Reordering timer is running on a receiver, wherein the receiver starts the t_Reordering timer when the receiver detects a gap in received data.

According to another set of embodiments, a wireless transmitter apparatus may comprise a first wireless interface, a memory, and a processor. The first wireless interface may be arranged to establish a communication link between the wireless transmitter and a wireless receiver based upon a radio protocol stack. The protocol stack may comprise at least a transmitter lower layer, a transmitter upper layer, a receiver lower layer, and a receiver upper layer. The memory may be arranged to store at least instructions used to execute logic control. The processor may be arranged to access the instructions in the memory and execute the control logic. The control logic may cause the wireless transmitter to configure a maximum retransmission number. If no acknowledgement from the receiver lower layer is received when the maximum retransmission number is reached, the control logic may cause the wireless transmitter to notify the transmitter upper layer of at least a relevant automatic retransmission request entity based upon input from the wireless transmitter lower layer. The control logic may further cause the wireless transmitter to retransmit a corresponding data from the wireless transmitter upper layer.

According to another set of embodiments, a computer-program storage apparatus for reducing transmission delays of a transmitter may comprise at least one memory having one or more software modules stored thereon. The one or more software modules may be executable by one or more processors in a wireless transmitter. The one or more software modules may comprise code for configuring a maximum retransmission number. The one or more software modules may further comprise code for notifying an upper protocol layer of the wireless transmitter at least a relevant automatic retransmission request entity based on input from a lower protocol layer of the wireless transmitter if no acknowledgement from the wireless receiver is received by the wireless transmitter when the maximum retransmission number is reached. The one or more software modules may further comprise code for retransmitting a corresponding data from the upper protocol layer of the transmitter.

Figure 1:
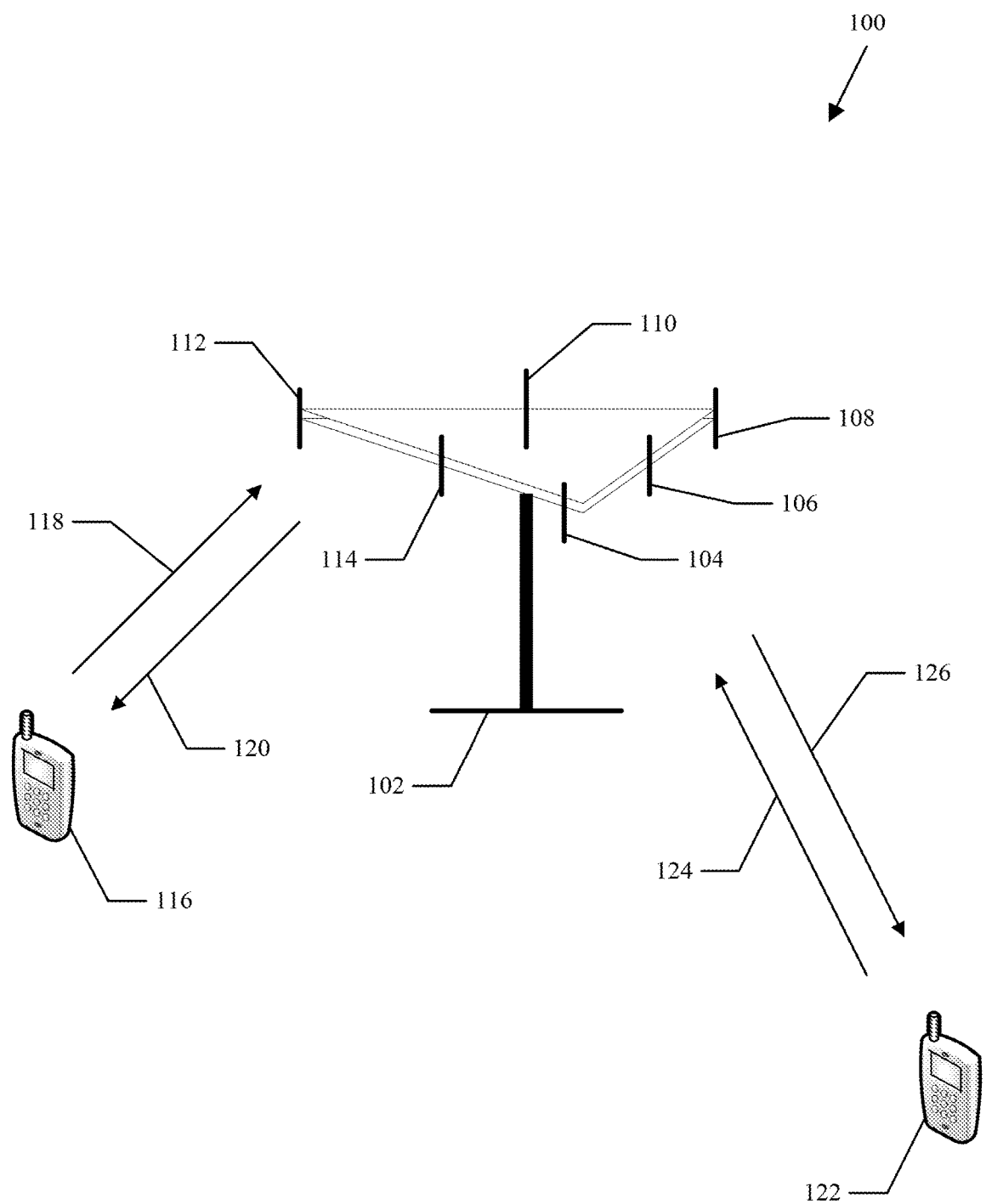
FIG. 1 illustrates an exemplary wireless multiple-access communication system according to certain embodiments.

It will be appreciated that for simplicity and clarity of illustration, elements illustrated in the drawings have not necessarily been drawn to scale. For example, the dimensions of some of the elements are exaggerated relative to other elements for purposes of promoting and improving clarity and understanding. Further, where considered appropriate, reference numerals have been repeated among the drawings to represent corresponding or analogous elements.

DETAILED DESCRIPTION

The following detailed description is directed to certain sample embodiments. However, the disclosure can be embodied in a multitude of different ways as defined and covered by the claims. In this description, reference is made to the drawings wherein like parts are designated with like numerals within this application.

This disclosure makes reference to various wireless communication devices, such as access point, mobile device, base station, user equipment, Node B, access terminal and eNB. The use of these and other names is not intended to indicate or mandate one particular device, one particular standard or protocol, or one particular signaling direction and is expressly intended to not be limiting of the scope of this application in any way. The use of these and other names is strictly for convenience and such names may be interchanged within this application without any loss of coverage or rights.

Various techniques described herein can be used for various wireless communication systems, such as Code Division Multiple Access ("CDMA") systems, Multiple-Carrier CDMA ("MC-CDMA"), Wideband CDMA ("W-CDMA"), High-Speed Packet Access ("HSPA," "HSPA+") systems, Time Division Multiple Access ("TDMA") systems, Frequency Division Multiple Access ("FDMA") systems, Single-Carrier FDMA ("SC-FDMA") systems, Orthogonal Frequency Division Multiple Access ("OFDMA") systems, or other multiple access techniques. A wireless communication system employing the teachings herein may be designed to implement one or more standards, such as IS-95, CDMA2000, IS-856, W-CDMA, TDSCDMA, and other standards. A CDMA network may implement a radio technology such as Universal Terrestrial Radio Access ("UTRA"), CDMA2000, or some other technology. UTRA includes W-CDMA and Low Chip Rate ("LCR"). The CDMA2000 technology covers IS-2000, IS-95 and IS-856 standards. A TDMA network may implement a radio technology such as Global System for Mobile Communications ("GSM"). An OFDMA network may implement a radio technology such as Evolved UTRA ("E-UTRA"), IEEE 802.11 ("Wi-Fi"), IEEE 802.16 "(Wi-MAX"), IEEE 802.20 ("MBWA"), Flash-OFDM®, etc. UTRA, E-UTRA, and GSM are part of Universal Mobile Telecommunication System ("UMTS"). The teachings herein may be implemented in a 3GPP Long Term Evolution ("LTE") system, an Ultra-Mobile Broadband ("UMB") system, and other types of systems. LTE is a release of UMTS that uses E-UTRA. Although certain aspects of the disclosure may be described using 3GPP terminology, it is to be understood that the teachings herein may be applied to 3GPP (Re199, Re15, Re16, Re17) technology, as well as 3GPP2 (1×RTT, 1× EV-DO Rel0, RevA, RevB) technology and other technologies, such as LTE (or LTE-Advanced), Voice over LTE (VoLTE), Wi-Fi, WiMAX, WMBA and the like.

Referring now to the drawings, FIG. 1 illustrates an exemplary wireless multiple-access communication system 100 according to certain embodiments. In one example, an evolved Node B (eNB) base station 102 includes multiple antenna groups. As shown in FIG. 1, one antenna group can include antennas 104 and 106, another can include antennas 108 and 110, and another can include antennas 112 and 114. While only two antennas are shown in FIG. 1 for each antenna group, it should be appreciated that more or fewer antennas may be utilized for each antenna group. As shown, user equipment (UE) 116 can be in communication with antennas 112 and 114, where antennas 112 and 114 transmit information to UE 116 over downlink (or forward link) 120 and receive information from UE 116 over uplink (or reverse link) 118. Additionally and/or alternatively, UE 122 can be in communication with antennas 104 and 106, where antennas 104 and 106 transmit information to UE 122 over downlink 126 and receive information from US 122 over uplink 124. In a frequency division duplex (FDD) system, communication links 118, 120, 124 and 126 can use different frequencies for communication. In time division duplex (TDD) systems, the communication links can use the same frequency for communication, but at differing times.

Each group of antennas and/or the area in which they are designed to communicate can be referred to as a sector of the eNB or base station. In accordance with one aspect, antenna groups can be designed to communicate to mobile devices in a sector of areas covered by eNB 102. In communication over downlinks 120 and 126, the transmitting antennas of eNB 102 can utilize beamforming in order to improve the signal-to-noise ratio of downlinks for the different UEs 116 and 122. Also, a base station using beamforming to transmit to UEs scattered randomly through its coverage causes less interference to mobile devices in neighboring cells than a base station transmitting through a single antenna to all its UEs. In addition to beamforming, the antenna groups can use other multi-antenna or antenna diversity techniques, such as spatial multiplexing, spatial diversity, pattern diversity, polarization diversity, transmit/receive diversity, adaptive arrays, and the like.

Figure 2:
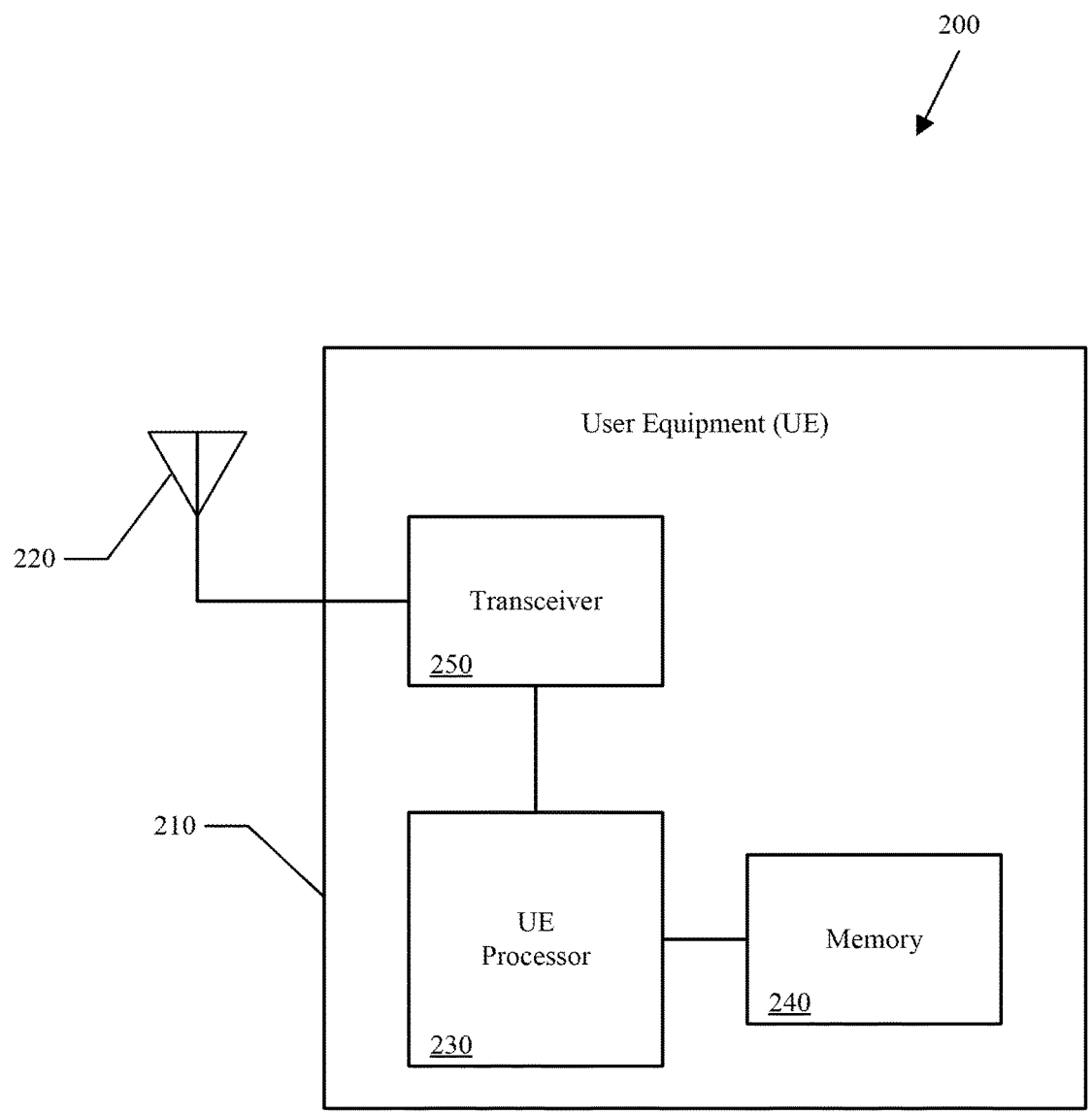
FIG. 2 illustrates a block diagram of an exemplary mobile device or user equipment (UE) according to certain embodiments.

FIG. 2 illustrates a block diagram 200 of an exemplary mobile device or user equipment (UE) 210 according to certain embodiments. As shown in FIG. 2, UE 210 may include a transceiver 250, an antenna 220, a processor 230, and a memory 240 (which, in certain embodiments, may include memory in a Subscriber Identity Module (SIM) card). In certain embodiments, some or all of the functionalities described herein as being performed by mobile communication devices may be provided by processor 230 executing instructions stored on a computer-readable medium, such as the memory 240, as shown in FIG. 2. Additionally, UE 210 may perform uplink and/or downlink communication functions, as further disclosed herein, via transceiver 250 and antenna 220. While only one antenna is shown for UE 210, certain embodiments are equally applicable to multi-antenna mobile devices. In certain embodiments, UE 210 may include additional components beyond those shown in FIG. 2 that may be responsible for enabling or performing the functions of UE 210, such as communicating with a base station in a network and for processing information for transmitting or from reception, including any of the functionality described herein. Such additional components are not shown in FIG. 2 but are intended to be within the scope of coverage of this application.

Figure 3:
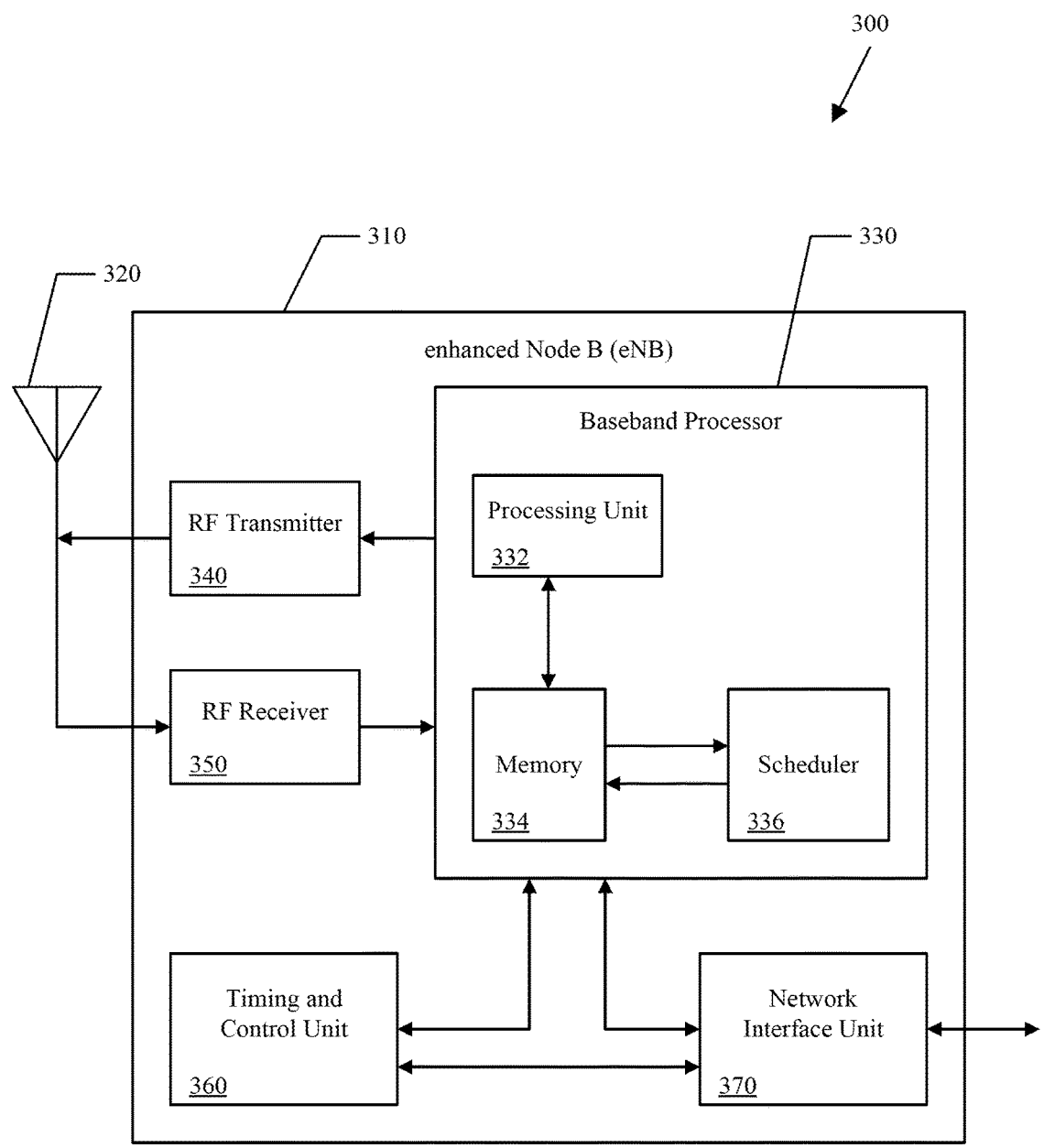
FIG. 3 illustrates a block diagram of an exemplary evolved Node B (eNB) or similar mobile communication node (e.g., base station, access point, etc.) according to certain embodiments.

FIG. 3 illustrates a block diagram 300 of an exemplary evolved Node B (eNB) 310 or similar mobile communication node (e.g., base station, access point, etc.) according to certain embodiments. As shown in FIG. 3, eNB 310 may include a baseband processor 330 to provide radio communication with mobile handsets via a radio frequency (RF) transmitter 340 and RF receiver 350 units coupled to the eNB antenna 320. While only one antenna is shown, certain embodiments are applicable to multi-antenna configurations. RF transmitter 340 and RF receiver 330 may be combined into one, transceiver unit, or duplicated to facilitate multiple antenna connections. Baseband processor 330 may be configured (in hardware and/or software) to function according to a wireless communications standard, such as 3GPP LTE. Baseband processor 320 may include a processing unit 332 in communication with a memory 334 to process and store relevant information for the eNB and a scheduler 336, which may provide scheduling decisions for mobile devices serviced by eNB 310. Scheduler 336 may have some or all of the same data structure as a typical scheduler in an eNB in an LTE system, e.g., an LTE system that supports VoLTE.

Baseband processor 330 may also provide additional baseband signal processing (e.g., mobile device registration, channel signal information transmission, radio resource management, etc.) as required. Processing unit 332 may include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Some or all of the functionalities described herein as being provided by a mobile base station, a base station controller, a node B, an evolved Node B, an access point, a home base station, a femtocell base station, and/or any other type of mobile communications node may be provided by processing unit 332 executing instructions stored on a computer-readable data storage medium, such as the memory 334 shown in FIG. 3.

In certain embodiments, eNB 310 may further include a timing and control unit 360 and a core network interface unit 370, such as are shown in FIG. 3. Timing and control unit 360 may monitor operations of baseband processor 330 and network interface unit 370, and may provide appropriate timing and control signals to these units. Network interface unit 370 may provide a bi-directional interface for eNB 310 to communicate with a core or back-end network (not shown) to facilitate administrative and call-management functions for mobile subscribers operating in the network through eNB 310.

Certain embodiments of the base station 310 may include additional components responsible for providing additional functionality, including any of the functionality identified herein and/or any functionality necessary to support the solution described herein. Although features and elements are described in particular combinations, each feature or element can be used alone without the other features and elements or in various combinations with or without one or more features and elements. Methodologies provided herein may be implemented in a computer program, software, or firmware incorporated in a computer-readable storage medium (e.g., memory 334 in FIG. 3) for execution by a general purpose computer or a processor (e.g., processing unit 332 in FIG. 3). Examples of computer-readable storage media include read only memory (ROM), random access memory (RAM), digital registers, cache memory, semiconductor memory devices, magnetic media such as internal hard disks, magnetic tapes and removable disks, magneto-optical media, and optical media such as CDROM disks, digital versatile disks (DVDs), and so on.

Figure 4:
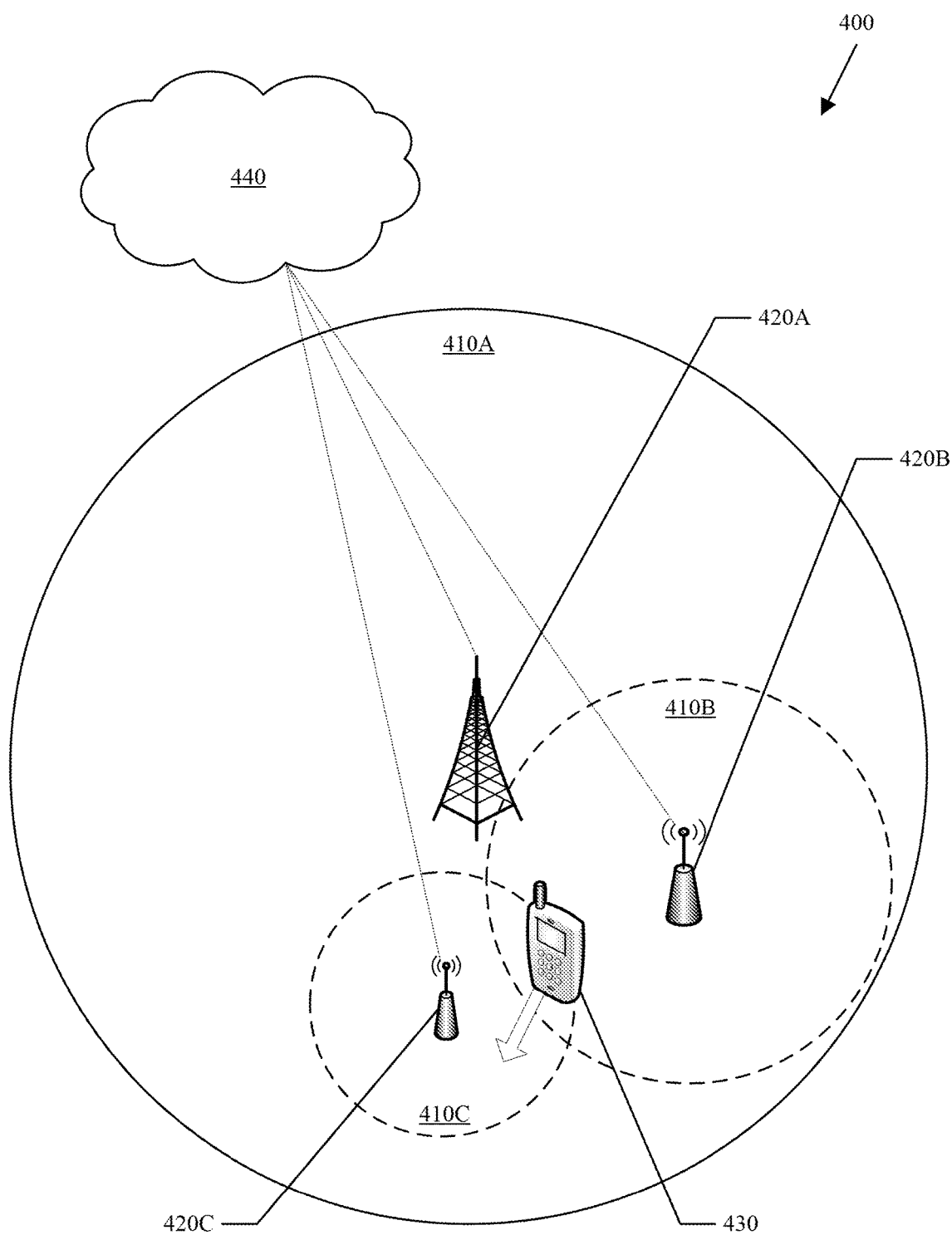
FIG. 4 illustrates an exemplary multi-RAT wireless network according to certain embodiments.

FIG. 4 illustrates an exemplary multi-RAT (radio access technology) wireless network 400 according to certain embodiments. As shown in FIG. 4, a mobile device (handset, UE, etc.) 430 is within the coverage area of multi-RAT wireless network 400. Multi-RAT wireless network 400 can include multiple network coverage pieces. For example, the once coverage area can be a cell 410A, such as in an LTE coverage area. Within (or partially within) cell 410A coverage area, there can concurrently exist one or more other coverage areas, or cells 410B and 410C, such as in a GSM, WiMAX, CDMA or even Wi-Fi coverage area. As shown, cells 410B, 410C are within cell 410A and at least partially overlap each other, although this configuration is for illustrative purposes only. Each cell 410 can also include some sort of network access device 420A, 420B and 420C, such as a base station, eNodeB or access point. Each network access device 420 can communicate with one or more mobile devices 430, as well as with a core network 440. Not shown are possible intermediate network components or system elements that may be between each network access device 420 and core network 440. In certain embodiments, mobile device 430 can be moving within cell 410A and moving out of cell 410B and into cell 410C. In this way, mobile device 430 could possibly communicate with one or more of cells 410A, 410B and 410C.

Figure 5:
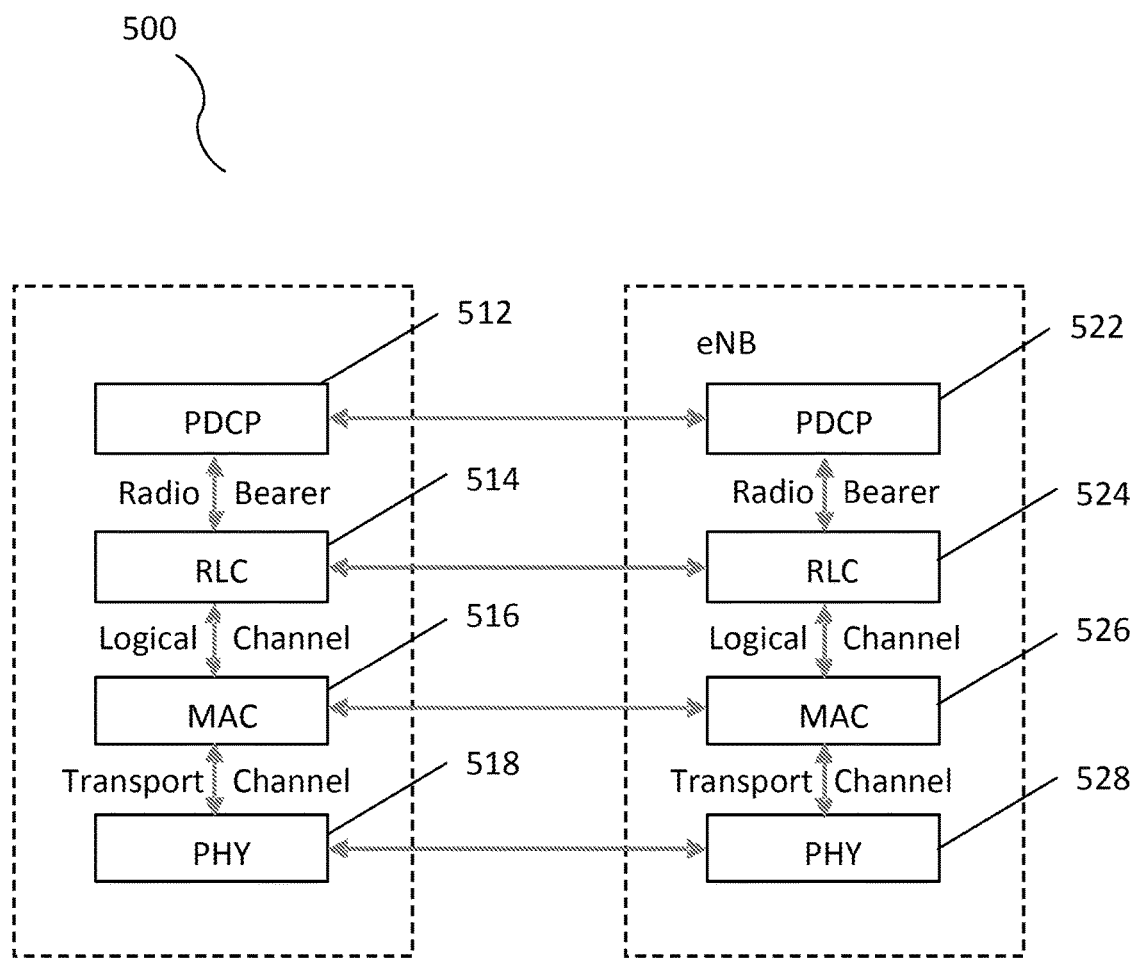
FIG. 5 illustrates an exemplary LTE User Plane Protocol Stack 500 according to certain embodiments.

FIG. 5 illustrates an exemplary LTE User Plane Protocol Stack 500 according to certain embodiments. The LTE radio interface protocol is generally applied between a user equipment (UE) and a base station or evolved Node B (eNodeB or eNB). LTE protocol consists of user-plane protocol and control-plane protocol. LTE user-plane provides the function of transferring user traffic data over the radio interface LTE-Uu between the UE and the eNodeB. As shown in FIG. 5, the LTE user plane protocol comprises UE PDCP (Packet Data Convergence Protocol) 512, UE RLC (Radio Link Control) 514, UE MAC (Medium Access Control) 516, UE PHY (Physical Layer) 518, eNB PDCP 522, eNB RLC 524, eNB MAC 526 and eNB PHY 528. LTE control-plane provides the function of transferring control messages. LTE control-plane protocol (not shown) is comprised of NAS (Non-Access Stratum) layer, which is on UE and MME (Mobility Management Entity), RRC (Radio Resource Control), PDCP, RLC, MAC, PHY.

Physical Layer (Layer 1)

In certain embodiments, the physical layer can carry all information from the MAC transport channels over the air interface. Physical layer takes care of the link adaptation or adaptive modulation and coding (AMC), power control, cell search (for initial synchronization and handover purposes) and other measurements (inside the LTE system and between systems) for the RRC layer.

Medium Access Layer (MAC)

In certain embodiment, the MAC layer can be responsible for mapping between logical channels and transport channels, multiplexing of MAC service data units (SDUs) from one or different logical channels onto transport blocks (TBs) to be delivered to the physical layer on transport channels, demultiplexing of MAC SDUs from one or different logical channels from transport blocks (TBs) delivered from the physical layer on transport channels, scheduling information reporting, error correction through hybrid automatic repeat request (HARD), priority handling between UEs by means of dynamic scheduling, priority handling between logical channels of one UE, logical channel prioritization.

Radio Link Control (RLC)

In certain embodiments, the RLC can operate in 3 modes of operation: transparent mode (TM), unacknowledged mode (UM), and acknowledged mode (AM). RLC Layer can be responsible for transfer of upper layer protocol data units (PDUs), error correction through automatic repeat request (ARQ) (i.e., for AM data transfer), Concatenation, segmentation and reassembly of RLC SDUs (i.e., for UM and AM data transfer). RLC also can be responsible for re-segmentation of RLC data PDUs (i.e., for AM data transfer), reordering of RLC data PDUs (i.e., for UM and AM data transfer), duplicate detection (i.e., for UM and AM data transfer), RLC SDU discard (i.e., for UM and AM data transfer), RLC re-establishment, and protocol error detection (i.e., for AM data transfer).

Packet Data Convergence Control (PDCP)

In certain embodiments, PDCP Layer can be responsible for header compression and decompression of IP data, transfer of data (user plane or control plane), maintenance of PDCP sequence numbers (SNs), in-sequence delivery of upper layer PDUs at re-establishment of lower layers, duplicate elimination of lower layer SDUs at re-establishment of lower layers for radio bearers mapped on RLC AM, ciphering and deciphering of user plane data and control plane data, integrity protection and integrity verification of control plane data, timer based discard, duplicate discarding, PDCP is used for SRBs and DRBs mapped on dedicated control channel (DCCH) and dedicated traffic channel (DTCH) type of logical channels.

PDCP, RLC and MAC layers are part of layer 2 structures. Transport channels are located between physical layer and MAC layer. Transport channels are used by the PHY layer to offer services to the MAC layer. Logic channels are located between MAC layer and RLC layers. Logical channels are used by the MAC to provide services to the RLC. Each logical channel is defined based on the type of information it carries. In LTE, there are two categories of logical channels depending on the service they provide: logical control channels and logical traffic channels. The logical control channels are used to transfer control plane information. The logical traffic channels are to transfer user plane information.

Figure 6:
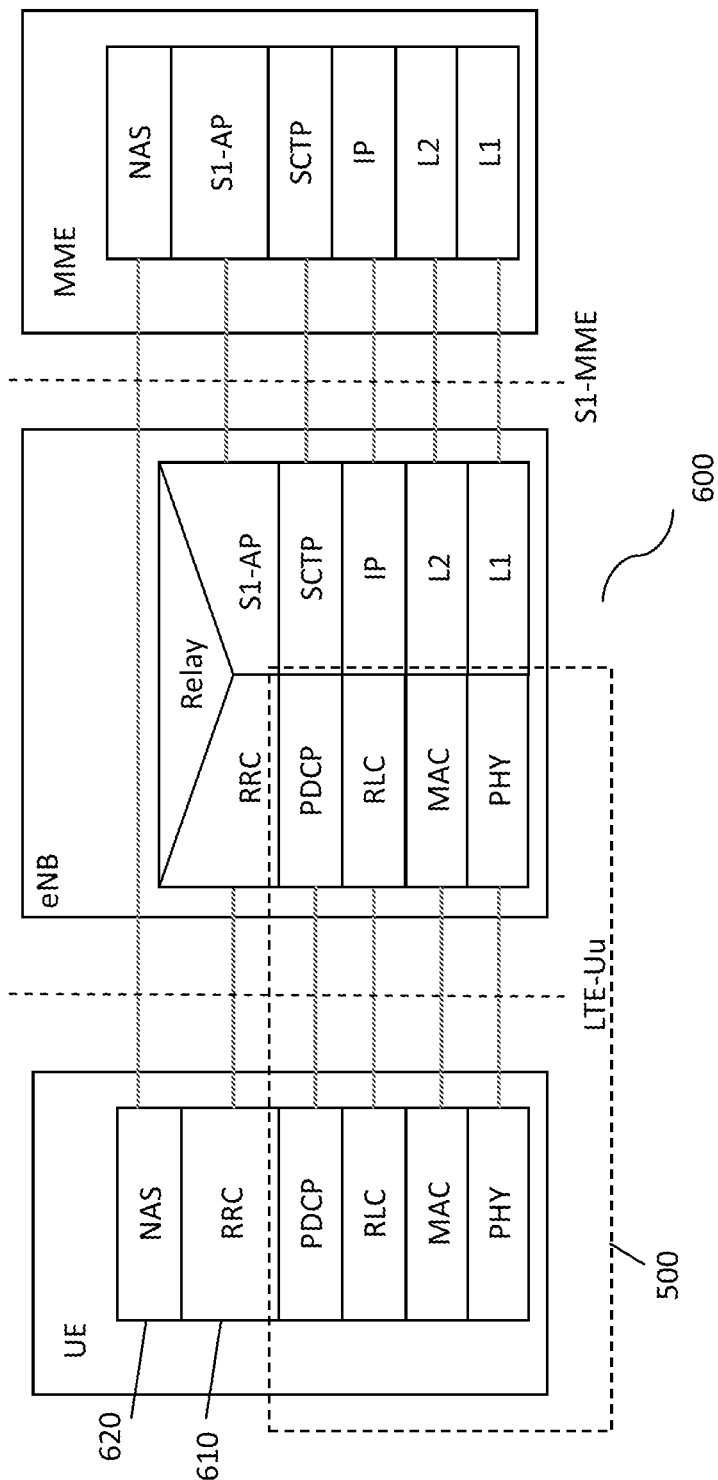
FIG. 6 illustrates an exemplary eNB Protocol Stack 600 according to certain embodiments.

FIG. 6 illustrates an exemplary eNB protocol stack 600 according to certain embodiments. The exemplary eNB protocol stack 600 comprises protocols between a UE and an eNB via LTE-Uu interface and protocols between the eNB and mobility management entity (MME) via S1-MME interface. The protocols via the LTE-Uu interface include the LTE user plane protocol stack shown in FIG. 5, UE RRC layer and UE NAS layer. Besides the protocols shown in FIG. 6, eNB protocols may also include other protocols, such as GTP-U protocol on the S1-U interface with the Serving Gateway (S-GW) for user plane traffic and X2-AP protocol on the X2 interface with other eNB elements.

Radio Resource Control (RRC)

The main services and functions of the RRC sublayer include broadcast of system information related to the non-access stratum (NAS), broadcast of system information related to the access stratum (AS), paging, establishment, maintenance and release of an RRC connection between the UE and evolved universal terrestrial access network (E-UTRAN), security functions including key management, establishment, configuration, maintenance and release of point to point radio bearers.

Non Access Stratum (NAS) Protocols

The non-access stratum (NAS) protocols form the highest stratum of the control plane between the user equipment (UE) and mobility management entity (MME). NAS protocols support the mobility of the UE and the session management procedures to establish and maintain IP connectivity between the UE and a packet data network gateway (PDN GW).

In the LTE user plane, the PHY layer provides a bit pipe with AMC (adaptive modulation and coding) by protected turbo-coding and a CRC (cyclic redundancy check), and processes CRC ACK/NACK feedback. The MAC sub-layer provides multiplexing/demultiplexing, error correction through Hybrid automatic repeat request (hybrid ARQ or HARQ), and scheduling. The RLC sub-layer provides the segmentation/concatenation/reassembly of RLC SDUs, reordering of RLC PDUs, in-sequence delivery, and error correction through ARQ. The PDCP sub-layer provides header compression, ciphering/integrity protection, and in-sequence delivery and retransmission of PDCP SDUs at handover.

In certain embodiments, HARQ is a combination of high-rate forward error-correcting coding and ARQ error-control. In standard ARQ, redundant bits are added to data to be transmitted using an error-detecting (ED) code such as a cyclic redundancy check (CRC). Receivers detecting a corrupted message will request a new message from the sender. In hybrid ARQ (HARQ), the original data is encoded with a forward error correction (FEC) code, and the parity bits are either immediately sent along with the message or only transmitted upon request when a receiver detects an erroneous message. The ED code may be omitted when a code is used that can perform both forward error correction (FEC) in addition to error detection, such as a Reed-Solomon code. The FEC code is chosen to correct an expected subset of all errors that may occur, while the ARQ method is used as a fallback to correct errors that are uncorrectable using only the redundancy sent in the initial transmission. As a result, HARQ performs better than ordinary ARQ in poor signal conditions, but in its simplest form this comes at the expense of significantly lower throughput in good signal conditions. There can be a signal quality cross-over point below which simple hybrid ARQ is better, and above which basic ARQ is better. HARQ is used in high-speed downlink packet access (HSDPA) and high-speed uplink packet access (HSUPA), which provide high speed data transmission (on downlink and uplink, respectively) for mobile phone networks such as UMTS, and in the IEEE 802.16-2005 standard for mobile broadband wireless access, also known as "mobile WiMAX". It is also used in EVDO and LTE wireless networks.

Typically there are three layers or places that HARQ/ARQ operate within an LTE protocol stack. For example, HARQ/ARQ can operate at the PHY/MAC layer(s), at the RLC layer or at the transmission control protocol (TCP) layer.

In HARQ, according to certain embodiments, a receiver sends feedback messages to a sender. These feedback messages are messages that the receiver uses to inform whether the transmission was successful or not: 'ACKnowledgement' (ACK) and 'Non-ACKnowledgement' (NACK). If the receiver detects a transmission error, the receiver sends CRC NACK feedback to the sender. When the MAC sub-layer HARQ function of the sender receives CRC NACK feedback from the receiver, it performs retransmissions of the corrupted TB (transport block), and thereby corrects the majority of all transmission errors. For example, the HARQ protocol can use eight stop-and-wait HARQ processes, and HARQ RTT (round trip delay time) in the uplink can be 8 ms and that in the downlink can be minimum 8 ms.

LTE supports two types of bearers, a UM (Unacknowledged Mode) bearer and an AM (Acknowledged Mode) bearer. The UM bearer makes use of a fail recovery by the HARQ at the MAC sub-layer only, and thus can be used for radio bearers that can tolerate a certain amount of loss. The AM bearer provides more reliability than the UM bearer by the help of ARQ retransmission at the RLC sub-layer.

To illustrate the problem, if the RLC sub-layer receiver detects a gap in the sequence numbers of the received PDUs, it starts a reordering timer assuming that the missing PDU is being (or will be) retransmitted in the HARQ protocol at the MAC sub-layer. HARQ failures happen if a maximum number of HARQ transmission attempts are exceeded or HARQ feedback NACK-to-ACK errors occur, wherein the missing PDU will not be retransmitted and thus there will be a hole in the PDU sequence. When the RLC reordering timer expires, usually in a HARQ failure case, an RLC UM receiver delivers service data units (SDUs) to the packet data convergence protocol (PDCP) with a certain amount of loss. However, an RLC AM receiver sends a status message comprising the sequence number of the missing PDUs to the sender. The ARQ function of the RLC AM sender performs retransmissions based on the received status message. The RLC ARQ protocol is a window-based selective repeat ARQ.

To further illustrate the problem, an LTE link layer provides "in-sequence delivery" of SDUs to the upper layer. When HARQ or ARQ in LTE link layer is working frequently for error recovery, "in-sequence delivery" in LTE link layer increases TCP RTT and decreases TCP throughput. If an RLC receiver detects a gap in the SN (sequence number) of received PDUs, it starts a reordering timer (t_Reordering) assuming that the missing PDU still is being (or will be) retransmitted in the HARQ protocol. After the gap is filled by HARQ retransmissions, an RLC receiver stops t_Reordering timer and delivers reassembled SDUs from received PDUs to PDCP. Therefore, in this example, the TCP RTT of packets that contain PDUs with the gap SN may be proportional to the MAC HARQ RTT.

If the t_Reordering timer expires, usually in a HARQ failure case, an RLC UM receiver delivers SDUs to PDCP with a certain amount of loss. In this example, the TCP RTT of packets that contain PDUs with the gap SN may be proportional to the t_Reordering timer, which is generally set as the maximum HARQ transmission number of times of the MAC HARQ RTT. In the case of an RLC AM receiver, the RLC AM receiver sends a status message comprising the sequence number of the missing PDUs to the sender. The ARQ function of the RLC AM sender performs retransmissions based on the received status message. In this case, the TCP RTT of packets that contain PDUs from the gap SN may be proportional to the RLC ARQ RTT.

To further illustrate the problem, if MAC HARQ fails, RLC ARQ attempts to recover the missing information. If the RLC layer does not recover the hole (e.g. missing SN), the TCP layer is left to attempt ARQ, which can negatively impact UL Tput (Uplink Throughput) performance. For example, if, in LTE, the MAC HARQ NACK $4^{th}$ retransmission (reTx) is configured (e.g., the maximum number of transmissions) and RLC did not recover a hole in the PDU sequence, then it is left to the LTE TCP layer/DUP ACK to recover the missing packet(s). DUP ACKs will be generated at the TCP layer, which results in TCP retransmission delays, and thus higher RTT and poor performance.

If TCP RTT is $RTT_{e2e}$ and "in-sequence delivery" LTE link layer increases TCP RTT by the amount of $RTT_{inc}$, the TCP throughput utilization is expressed as below equation.

$$\rho = \frac{RTT_{e2e}}{RTT_{e2e} + RTT_{inc}}, \text{ where}$$

$$RTT_{inc} = \sum_{j=0}^{m} \sum_{i=1}^{n} p_{i,j} \sum_{k=0}^{N} d_k,$$

where
$\rho$: TCP throughput utilization, $RTT_{e2e}$: TCP end-to-end RTT, $P_{i,j}$: probability of successful transmission with i HARQ transmissions and j ARQ retransmissions,
N: number of delayed PDUs due to "in-sequence delivery" reordering, and
$d_k$: delivery delay.

To further illustrate the problem, for an LTE design, the HARQ BLER is on the order of $10^{-1}$, the HARQ feedback NACK-to-ACK error probability is on the order of $10^{-4}$ and the RLC PDU loss probability after the HARQ is on the order of $10^{-3}$. In one example, residual BLER is on the order of $10^{-2}$, $5*10^{-3}$, $2*10^{-3}$, and $10^{-3}$, after two, three, four and five HARQ transmissions each. If TB is successfully received with only one HARQ transmission, i.e., i=1, j=0, $d_k$ is 0. If TB is successfully received after two HARQ transmissions, i.e., i=2, j=0, $P_{i,j}$ is 0.1, maximum of N is 8 and $d_k$ is HARQ RTT at maximum and 0 at minimum. Therefore, if HARQ RTT is 8 ms, $RTT_{inc}$ is calculated as [$P_{2,0}*8*9/2$=3.6 ms]. If TB is successfully received after three HARQ transmissions, i.e., i=3, j=0, $P_{i,j}$ is assumed as $10^{-2}$, the maximum of N is 16, and $d_k$ is HARQ RTT*2 at maximum and 0 at minimum. Therefore, if HARQ RTT is 8 ms, $RTT_{inc}$ is calculated as [$P_{3,0}*16*17/2$=1.36 ms].

If DL HARQ RTT is 8 ms and TCP RTT is 10 ms, TCP throughput can be decreased to as little as 36% of maximum bandwidth. If DL HARQ RTT is 12 ms and TCP RTT is 10 ms, TCP throughput can be decreased to as little as 26% of maximum bandwidth. In worst case, if DL HARQ RTT is 16 ms and TCP RTT is 10 ms, TCP throughput can be decreased to as little as 19% of maximum bandwidth. If DL HARQ RTT is 8 ms and TCP RTT is 50 ms, TCP throughput can be decreased to as little as 74% of maximum bandwidth. If DL HARQ RTT is 12 ms and TCP RTT is 50 ms, TCP throughput can be decreased to as little as 64% of maximum bandwidth. If DL HARQ RTT is 16 ms and TCP RTT is 50 ms, TCP throughput can be decreased to as little as 55% of maximum bandwidth. The shorter the TCP end-to-end RTT and the longer the DL HARQ RTT, the lower the TCP throughput.

Figure 7:
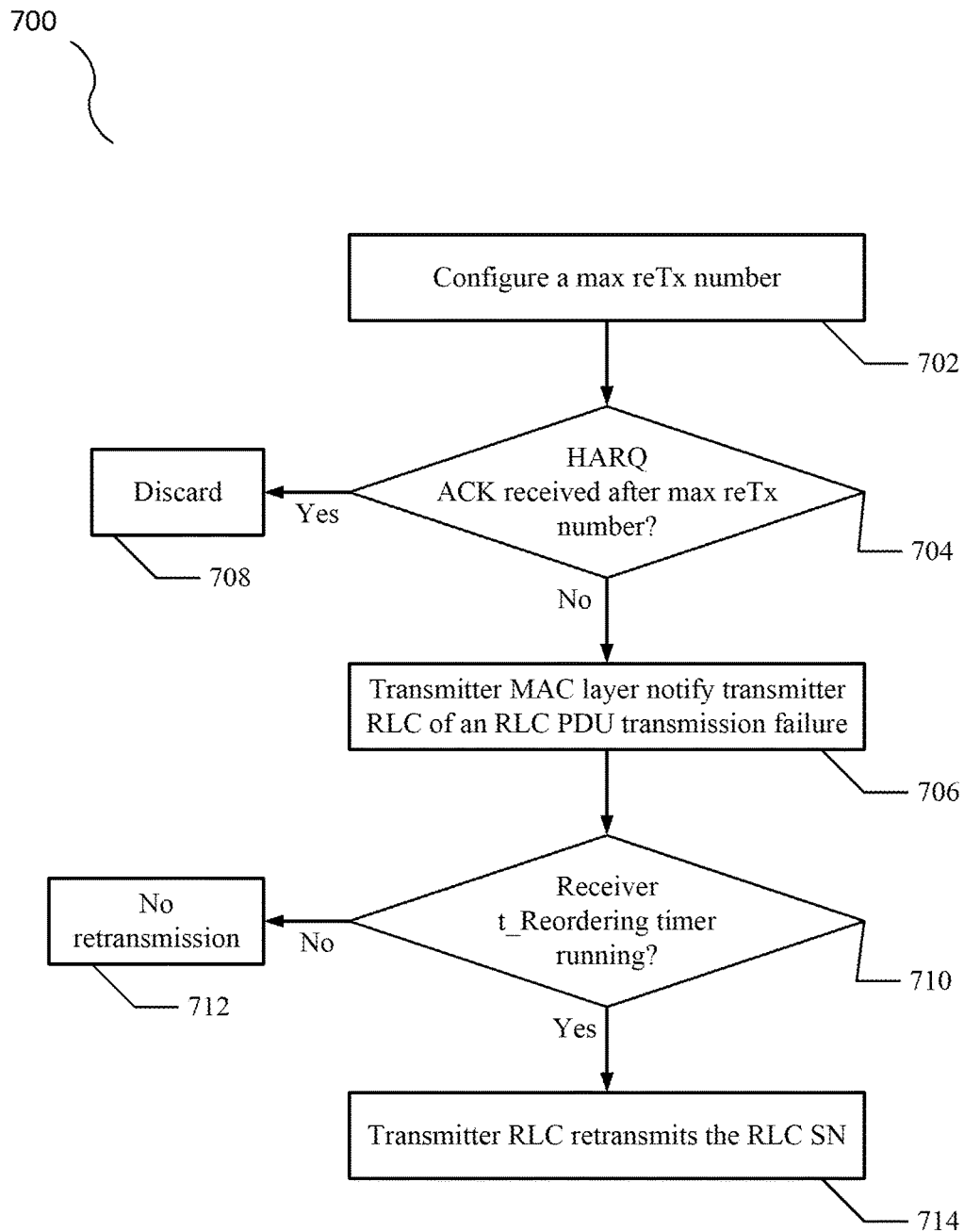
FIG. 7 illustrates an exemplary process to reduce retransmission delays according to certain embodiments.

FIG. 7 illustrates an exemplary method 700 performed by a transmitter to reduce retransmission delays in a wireless communication system according to certain embodiments.

The transmitter comprises at least a microprocessor, an antenna, a memory having one or more software modules stored thereon and a transceiver. The transmitter is configured to establish a communication link to a receiver according to an interface protocol comprising a lower layer protocol and an upper layer protocol. The transmitter may be UE 200 during an uplink time slot or eNB 300 during a downlink time slot. Method 700 can be carried out by performing at least the operations of FIG. 7.

As shown in FIG. 7, at 702, a maximum retransmission number is configured. The maximum retransmission number may be configured to any desired number, such as 4, 6 or 8. In certain embodiments, the maximum retransmission number is configured by the UE. In certain embodiments, the maximum retransmission number is configured by the eNB.

At 704, the transmitter checks whether a HARQ ACK is received after the maximum retransmission number is reached. If not, method 700 enters 706, wherein the upper layer on the transmitter is notified of at least a relevant ARQ entity based on input from the lower layer. In certain embodiments, the lower layer is a MAC layer and the upper layer is a RLC layer. The communication between the lower layer and the upper layer may be realized via logic channels between MAC and RLC layers. The relevant ARQ entity may be a gap in SN corresponding to a hole in a PDU sequence received on the wireless receiver side. If, at 704, the transmitter does receive a HARQ ACK after the maximum retransmission number is received, it is discarded 708. In this case, data at HARQ will have been discarded after maximum retransmission number timer has expired at the transmitter (i.e., there will not be HARQ status for the PDUs at the transmitter).

In certain embodiments, at 710, the transmitter RLC is configured to trigger a retransmission when t_Reordering timer is running on the receiving side. If an RLC receiver detects a gap in the SN (sequence number) of received PDUs, it can start a reordering timer (t_Reordering), assuming that the missing PDU still is being (or will be) retransmitted in the HARQ protocol. After the gap is filled by HARQ retransmissions, the RLC receiver stops t_Reordering timer and delivers reassembled SDUs from received PDUs to PDCP. At 712, if the receiver t_Reordering timer is not running (i.e., has expired), then the receiving RLC will not be looking for a status PDU corresponding to a NACK'd PDU. In this case, no retransmission at RLC will be triggered, as this data will be discarded at receiving RLC.

At 714, if the receiver t_Reordering timer is running, the transmitter RLC retransmits corresponding data from the upper layer. The corresponding data may be a sequence number (SN) corresponding to the gap SN of the PDU. In this way, by having the transmitter RLC retransmit while the receiver t_Reordering timer is still running, throughput may be increased by having RLC provide the missing information instead of waiting for the gap to be filled by HARQ retransmissions (or not filled, and passing up to TCP/IP).

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill would further appreciate that the various illustrative logical blocks, modules, and algorithm steps or operations described in connection with the examples disclosed herein may be implemented as electronic hardware, firmware, computer software, middleware, microcode, or combinations thereof. To clearly illustrate this interchangeability of hardware and software, various illustrative components, blocks, modules, circuits, steps and operations have been described above generally in terms of their functionality. Whether such functionality is implemented as hardware or software depends upon the particular application and design constraints or preferences imposed on the overall system. Skilled artisans may implement the described functionality in varying ways for each particular application, but such implementation decisions should not be interpreted as causing a departure from the scope of the disclosed methods.

The various illustrative logical blocks, components, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps or operations of a method or algorithm described in connection with the examples disclosed herein may be embodied directly in hardware, in one or more software modules executed by one or more processing elements, or in a combination of the two. A software module may reside in RAM memory, flash memory, ROM memory, EPROM memory, EEPROM memory, registers, hard disk, a removable disk, a CD-ROM, or any other form or combination of storage medium known in the art. An example storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method to reduce retransmission delays of a transmitter, the method comprising:
    configuring a maximum retransmission number;
    if no acknowledgement (ACK) is received by the transmitter when the maximum retransmission number is reached, notifying an upper protocol layer of the transmitter of at least a relevant automatic retransmission request (ARQ) entity based on input from a lower protocol layer of the transmitter; and
    retransmitting a corresponding data from the upper protocol layer of the transmitter, wherein the upper protocol layer of the transmitter retransmits the corresponding data without waiting for receiving a non-acknowledgement (NACK), wherein the corresponding data is re-transmitted when a reordering timer is running on a receiver, and wherein the receiver starts the reordering timer when the receiver detects a gap in received data.

2. The method of claim 1, wherein the transmitter is selected from one of a user equipment (UE) and an evolved Node B (eNB).

3. The method of claim 1, wherein the maximum retransmission number is configured to 4, 6 or 8.

4. The method of claim 1, wherein the lower protocol layer of the transmitter is a media access control (MAC) layer and the upper protocol layer of the transmitter is a radio link control (RLC) layer.

5. The method of claim 1, wherein the relevant ARQ entity is a protocol data unit (PDU) corresponding to a hole in a PDU sequence received on a wireless receiver.

6. The method of claim 5, wherein the corresponding data is a sequence number (SN) of the PDU.

7. A wireless transmitter apparatus, comprising:
a first wireless interface arranged to establish a communication link between the wireless transmitter and a wireless receiver based upon a radio protocol stack, wherein the protocol stack comprises at least a transmitter lower layer, a transmitter upper layer, a receiver lower layer and a receiver upper layer;
a memory arranged to store at least instructions used to execute control logic; and
a processor arranged to access the instructions in the memory and execute the control logic, the control logic causing the wireless transmitter to:
configure a maximum retransmission number;
if no acknowledgement (ACK) from the receiver lower layer is received when the maximum retransmission number is reached, notify the transmitter upper layer of at least a relevant automatic retransmission request (ARQ) entity based on input from the wireless transmitter lower layer; and
retransmit a corresponding data from the wireless transmitter upper layer, wherein the upper layer retransmits the corresponding data without waiting for receiving a non-acknowledgement (NACK) from the wireless receiver, wherein the corresponding data is re-transmitted only when a reordering timer is running on the wireless receiver, and wherein the wireless receiver starts the reordering time when the wireless receiver detects a gap in received data.

8. The apparatus of claim 7, wherein the wireless transmitter and the wireless receiver are selected from respective ones of a user equipment (UE) and an evolved Node B (eNB).

9. The apparatus of claim 7, wherein the maximum retransmission number is configured to 4, 6 or 8.

10. The apparatus of claim 7, wherein the wireless transmitter lower layer and the wireless receiver lower layer is a media access control (MAC) layer and the wireless transmitter upper layer and the wireless receiver upper layer is a radio link control (RLC) layer.

11. The apparatus of claim 7, wherein the relevant ARQ entity is a protocol data unit (PDU) corresponding to a hole in a PDU sequence received on the wireless receiver side.

12. The apparatus of claim 11, wherein the corresponding data is a sequence number (SN) of the PDU.

13. A computer-program storage apparatus for reducing retransmission delays of a transmitter comprising at least one memory having one or more software modules stored thereon, the one or more software modules being executable by one or more processors in a wireless transmitter, the one or more software modules comprising:
code for configuring a maximum retransmission number;
code for notifying an upper protocol layer of the wireless transmitter at least a relevant automatic retransmission request (ARQ) entity based on input from an lower protocol layer of the wireless transmitter if no acknowledgement (ACK) from a wireless receiver is received by the wireless transmitter when the maximum retransmission number is reached; and
code for retransmitting a corresponding data from the upper protocol layer of the transmitter, wherein the upper protocol layer of the transmitter retransmits the corresponding data without waiting for receiving a non-acknowledgement (NACK) from the wireless receiver, wherein the corresponding data is re-transmitted only when a reordering timer is running on the wireless receiver, and wherein the wireless receiver starts the reordering time when the wireless receiver detects a gap in received data.

14. The apparatus of claim 13, wherein the lower protocol layer of the wireless transmitter is a media access control (MAC) layer and the upper protocol layer of the wireless transmitter is a radio link control (RLC) layer.

* * * * *